United States Statutory Invention Registration [19]

[11] Reg. Number: H483

Moran et al. [43] Published: Jun. 7, 1988

[54] BINARY SOLVENT FOR DYE LASER

[75] Inventors: Mark B. Moran; C. Denton Marrs, both of Ridgecrest, Calif.

[73] Assignee: The United States of America as represented by the Secretary of the Navy, Washington, D.C.

[21] Appl. No.: 36,226

[22] Filed: Apr. 3, 1987

[51] Int. Cl.[4] ..... H01S 3/20

[52] U.S. Cl. ..... 372/53; 252/301.17

[56] References Cited

PUBLICATIONS

Z. Konefal, E. Lisicki, and T. Marszalek; The Influence of Energy Migration in Micellar Dye Solutions on the Performance of Dye Lasers, Physica Polinica A52, pp. 149–155 (1977).

G. A. Kenney-Wallace and J. H. Flint; Resonance Energy Transfer Between Lasing Dyes in Micellar Media, Chemical Physics Letters, 32(1), pp. 71–75 (1975).

*Primary Examiner*—John F. Terapane
*Assistant Examiner*—Susan Wolffe
*Attorney, Agent, or Firm*—William C. Townsend; W. Thom Skeer; Stephen J. Church

[57] ABSTRACT

A binary solvent for liquid dye laser systems comprising a surfactant having a hydrophobic end and a hydrophilic end in a viscous polar solvent provides a method of improving the output, efficiency and lifetime of laser dyes, particularly in non-flowing liquid dye laser systems.

11 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BINARY SOLVENT FOR DYE LASER

BACKGROUND OF THE INVENTION

1. Field of the Invention

This invention relates to organic dye lasers and more particularly to dye laser solutions. Even more particularly, this invention relates to the use of surfactants to improve the performance of non-flowing dye laser systems.

2. Description of the Prior Art

Liquid dye laser systems using conventional solvents require a reservoir of dye solution for circulation through the dye cell. A pumping network adds to the system complexity and size but is necessary to maintain the necessary flow and temperature to prevent premature breakdown of the laser dye.

Additives to the dye solution which would assist in energy transfer between dye molecules would lead to more efficient lasers. This would reduce the volume of dye solution needed for operation of the dye laser. In turn, this would make liquid dye lasers more efficient, simple and compact thereby providing additional applications that are not presently possible.

Surfactants are known to aid in preventing the dimerization of laser dye molecules, yielding a more uniform monomer solution. However, excess dye molecules not combined with surfactant could result in formation of ground state aggregates, causing increased absorption at the lasing wavelength and quenching by eximer formation. It is also known that, for a fixed concentration of surfactant, an increase in the concentration of certain types of dye molecules will lead to an increase in the number of these dye molecules per micelle if conditions for micelle formation, solvent and dye molecules have satisfied certain requirements.

Surfactant additives have been used with low viscosity solvents in flowing dye laser systems. Increases in fluorescence yield in such systems have been measured. This improvement has been attributed to the above described surfactant effects on dimerization and dye concentration effects on the number of dye molecules per micelle.

Solvent viscosity is known to affect the formation and properties of micelles. It is also known that certain viscous solvents have thermal and optical properties which would be useful in a non-flowing liquid dye laser system. However, significant increases in laser dye output, conversion efficiency, and laser dye lifetime resulting from certain combinations of surfactants and viscous polar solvents are quite unexpected and are not obvious from the prior art.

SUMMARY OF THE INVENTION

One object of this invention is to produce a binary solvent comprising a surfactant and a viscous polar solvent for use with laser dyes in a liquid dye laser system.

Another object of this invention is to provide a method of increasing the lasing output and extending the lifetime of laser dyes using a binary solvent system.

A further object of this invention is to provide a non-flowing liquid dye laser having a high lasing output, conversion efficiency and dye lifetime.

According to the present invention a binary solvent for use with chemical laser dyes having hydrophobic groups in a dye laser is prepared by adding a sufficient concentration of a surfactant having a hydrophobic end group and a hydrophilic end group to a viscous polar solvent so that the surfactant molecules form micelles having hydrocarbon-like interiors which tend to solubilize said dye molecules. The surfactants sodium dodecyl sulfate and sodium poly(oxyethylene) 3-lauryl sulfate have been found to work well. Ethylene glycol and a 10% saline solution have been found to work well as solvents.

The method of increasing lasing output and extending lifetime of laser dyes encompasses the steps of forming a binary solvent having micelles; and then adding a laser dye having hydrophobic groups to the binary solvent in sufficient amount to create a ratio of dye molecules per micelle in the range from 2 to 3, so that the dye molecules possessing hydrophobic groups will be solubilized in the hydrocarbon-like interiors of the micelles, thereby forming stable colloidal suspensions.

The non-flowing liquid dye laser comprises a binary solvent having micelles and a hydrophobic laser dye added in sufficient quantity to form a ratio of dye molecules per micelle in the range of from 2 to 3 so that the dye molecules, solubilized in the micelles, form stable colloidal suspensions which increase the energy conversion efficiency and thermal stability of the dye solution thereby reducing the volume of dye solution needed for operation.

DETAILED DESCRIPTION OF THE INVENTION

According to the present invention, the use of some surfactants with certain viscous solvents as a binary solvent system dramatically improves lasing output, conversion efficiency and lifetime of certain laser dyes. The binary solvent system essentially comprises a surfactant having a hydrophilic end group and an hydrophobic end group and a viscous polar solvent. In general, any viscious polar solvent will work, particularly the hydroxy alcohols such as ethylene glycol. Because of thermal properties which aid micelle formation, water may also be used as a solvent.

The amount of surfactant necessary is the amount which forms the critical micelle concentration. This critical micelle concentration is a function of the molecular weight of the surfactant and the type of solvent. The size of the micelle formed dictates the amount of dye necessary to have a ratio of about two to three dye molecules per micelle. The surfactants sodium dodecyl sulfate and sodium poly(oxyethylene) 3-lauryl sulfate have been found to work well.

Laser dyes having hydrophobic end groups are easily solubilized with the hydrocarbon-like interior of the micelles. Rhodamine 6G perchlorate is an example of such a laser dye. Rhodamine 6G perchlorate has the following structure:

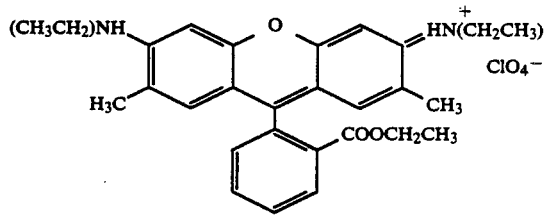

Each micelle provides a confined environment for several dye molecules. This arranges the dye molecule emission oscillations with greater regularity so that energy transfer between molecules is improved. Furthermore, isolation between groups of dye molecules in the micelles prevents dimerization which can interfere with operation of the dye laser.

In low viscosity polar solvents such as methanol or ethanol, micellization does not readily occur. If micellization does occur, the packing density of the surfactant molecules is very small. This is presumed because the polar surfactant molecules can dissolve in the low viscosity solvent without distorting the solvent's liquid structure to any significant extent. Additionally, since the low viscosity polar solvents have poorer thermal properties than water, temperature effects that disfavor micelle formation are increased.

High viscosity polar solvents, such as the hydroxy alochols, generally produce tightly packed micelle structures having highly ordered arrangements of dye molecules for efficient resonance energy transfer between dye molecules. Because these viscous solvents have better thermal heat transfer capabilities than low viscosity solvents, non-flowing liquid dye laser systems are possible. Furthermore, because viscous solvents increase resonance energy transfer between molecules, more efficient dye lasers are possible.

The following example is given to illustrate but not limit the invention:

EXAMPLE

A dye laser using a standard (4 cm high$\times$1 cm$^2$ cross section) spectroscopic cell as the dye reservoir was pumped transversely with 1.0 usec pulses form a repetitively pulsed dye laser. The pump radiation had a wavelength of 496 nm with a bandwidth of 0.04 nm. Several tests were performed with broadband operation of the pump laser, 484–508 nm. The pump radiation was focused onto the dye cell using a 800 mm focal length plane convex lens and was maintained at 0.1 J/pulse. The beam dimensions on the dye cell were 8 mm$\times$16 mm. The cavity consisted of a 100% reflector, the dye cuvette and a 40% reflective output coupler with a 8 meter radius of curvature. No attempt was made to optimize the cavity for each dye solution. Since the lasing bandwidth was measured, no intercavity tuning element was used. A quarter-meter Bausch and Lomb spectrometer was used to measure the lasing bandwidth. The dye laser output energy was measured with a Gen-tec pyroelectric detector. A repetition rate of 1 Hz was used, with 5 Hz on selected samples.

The dye concentrations for the alcohols were chosen as the recommended concentration for each solvent when pumped by the 532 nm line of a Nd:YAG laser. The ethanol solution was used to provide a baseline to which any improvement could be judged. The dye concentration in the ethylene glycol was that for Argon Ion laser pumping (514 nm). Ethylene glycol was also chosen for its better thermal properties and to see the effects of increased viscosity on dye laser action. Dye concentration for the 10% saline solution was kept as that of ethanol.

The effects of various solvent and surfactant combinations on the laser dye Rhodamine 6G perchlorate are reported in Table 1.

TABLE 1

Results of Solutions Studied.

| Solvent | Dye conc M | Maximum Output mJ | Conversion efficiency % | Laser bandwidth nm | Lifetime, number pulses[a] |
|---|---|---|---|---|---|
| Ethanol | $5\times10^{-4}$ | 1.5 | 1.4 | 555–596 | 1 |
| 1.3 M SDS[b] in water | $5\times10^{-5}$ | 3.0 | 2.3 | 536–603 | 4 |
| Ethylene glycol | $2\times10^{-3}$ | 4.1 | 3.4 | 565–607 | 5 |
| Ethylene glycol + $5\times10^{-4}$ M SDS | $2\times10^{-3}$ | 11.5 | 10.5 | 563–603 | >1000[c] |
| 2.5 M NaPOELS[d] | $5\times10^{-4}$ | 10.2 | 9.4 | 551–614 | 60 |

[a]To degrade output by 50% at 1 Hz.
[b]Sodium dodecyl sulfate.
[c]≧50% output for >15 minutes at 1 Hz and ≧50% output for >5 minutes at 5 Hz.
[d]Sodium poly (oxyethylene)3-lauryl sulfate in 10% saline solution.

The effect of viscosity on dye laser action is reported in Table 2.

TABLE 2

Lifetime Performance and Viscosity

| Solution | Lifetime number of pulses | Viscosity cP[a] |
|---|---|---|
| Ethanol | 1 | 0.83 |
| 1.3 M SDS in water | 4 | — |
| Ethylene glycol | 5 | 12.5 |
| Ethylene glycol + $5\times10^{-4}$ M SDS | >1000 | — |
| 2.5 M NaPOELS | >60 | 69.5 |

[a]Viscosity measured at 37.8° C., one atmosphere.

Modifications and variations of the present invention are possible. It should be understood that, within the scope of the appended claims, the invention may be practiced otherwise than as specifically described.

What is claimed is:

1. A binary solvent for use with laser dyes having hydrophobic groups in a dye laser, the binary solvent comprising a surfactant having a hydrophobic end group and a hydrophilic end group, said surfactant selected from the group consisting of sodium dodecyl sulfate and sodium poly(oxyethylene) 3-lauryl sulfate; and a viscous polar solvent selected from the group consisting of ethylene glycol and 10% saline solution wherein a sufficient concentration of surfactant molecules are added to form micelles having hydrocarbon-like interiors which tend to solubilize molecules of said laser dyes.

2. A binary solvent as in claim 1 comprising from about $5\times10^{-4}$M to about $7\times10^{-4}$M sodium dodecyl sulfate in ethylene glycol.

3. A binary solvent as in claim 1 comprising about 2.5 M sodium poly(oxyethylene) 3-lauryl sulfate in 10% saline solution.

4. A method of increasing lasing output and extending lifetime of laser dyes, said method comprising the following steps:

adding a surfactant having a hydrophilic end and a hydrophobic end selected from the group consisting of sodium dodecyl sulfate and sodium poly(oxyethylene) 3-lauryl sulfate to a polar solvent selected from the group consisting of ethylene glycol, and 10% saline solution; said surfactant added in sufficient concentration to form a binary solvent having micelles; and adding a laser dye having hydrophobic groups to said binary solvent in sufficient amount to create a ratio of dye molecules per micelle in the range from 2 to 3;

so that said dye molecules possessing hydrophobic groups will be solubilized in the hydrocarbon-like interiors of the micelles, thereby forming stable colloidal suspensions.

5. The method of claim 4 wherein said binary solvent comprises from about $5\times10^{-4}$M to about $7\times10^{-4}$M sodium dodecyl sulfate in ethylene glycol.

6. The method of claim 4 wherein said binary solvent comprises about 2.5 M sodium poly(oxyethylene) 3-lauryl sulfate in 10% saline solution.

7. The method of claim 4 wherein said laser dye having hydrophobic groups is a laser dye having the following structure:

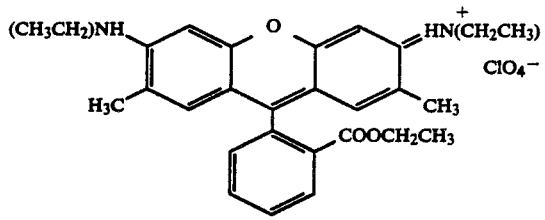

8. A non-flowing liquid dye laser comprising a volume of a laser dye solution and a pumping energy source operably coupled therewith and capable of producing stimulated emission of said dye solution by conversion of energy from said source, said dye solution comprising:

a binary solvent consisting of a surfactant selected from the group consisting of sodium dodecyl sulfate and sodium poly(oxyethylene) 3-lauryl sulfate added to a polar solvent selected from the group consisting of ethylene glycol and 10% saline solution; said surfactant having a hydrophobic end group and a hydrophilic end group added in sufficient quantity to form micelles; and a laser dye having hydrophobic groups wherein said dye molecules are solubilized within the hydrocarbon-like interior of the micelles, said dye added in sufficient quantity to form a ratio of dye molecules per micelle in the range from 2 to 3 so that said dye molecules, solubilized in the micelles, form stable colloidal suspensions which increase the efficiency of said conversion and the thermal stability of said dye solution thereby reducing the volume of dye solution needed for operation.

9. The non-flowing dye laser of claim 8 wherein said binary solvent comprises from about $5\times10^{-4}$M to about $7\times10^{-4}$M sodium dodecyl sulfate in ethylene glycol.

10. The non-flowing dye laser of claim 8 wherein said binary solvent comprises about 2.5M sodium poly(oxyethylene) 3-lauryl sulfate in 10% saline solution.

11. The non-flowing dye laser of claim 8 wherein said laser dye having hydrophobic groups is a laser dye having the following structure:

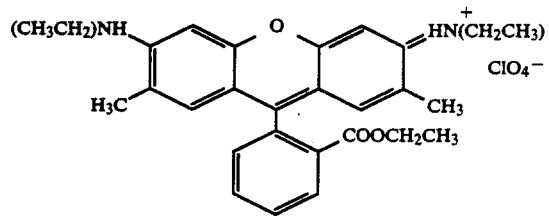

* * * * *